US010540668B2

(12) United States Patent
Hoertz

(10) Patent No.: US 10,540,668 B2
(45) Date of Patent: Jan. 21, 2020

(54) MAP BASED GRAPHICAL USER INTERFACE FOR IDENTIFYING SALES TARGETS AND DETERMINING SALES POTENTIAL

(71) Applicant: ASK Chemicals L.P., Wilmington, DE (US)

(72) Inventor: Charles Conley Hoertz, Dublin, OH (US)

(73) Assignee: ASK Chemicals LLC, Wilmington, DE (US)

( * ) Notice: Subject to any disclaimer, the term of this patent is extended or adjusted under 35 U.S.C. 154(b) by 179 days.

(21) Appl. No.: 15/475,972

(22) Filed: Mar. 31, 2017

(65) Prior Publication Data

US 2018/0285907 A1    Oct. 4, 2018

(51) Int. Cl.
    *G06Q 30/02*    (2012.01)
(52) U.S. Cl.
    CPC .............. *G06Q 30/0205* (2013.01)
(58) Field of Classification Search
    CPC ............. G06Q 30/0201; G06Q 10/00; G06Q 30/0205; G06Q 10/06398; G06Q 10/06393
    See application file for complete search history.

(56) References Cited

U.S. PATENT DOCUMENTS

| 5,032,989 | A  | * | 7/1991  | Tornetta  | G06Q 10/087 |
|           |    |   |         |           | 705/313     |
| 6,240,360 | B1 | * | 5/2001  | Phelan    | G01C 21/26  |
|           |    |   |         |           | 701/438     |
| 6,578,009 | B1 | * | 6/2003  | Shinozaki | G06Q 10/06  |
|           |    |   |         |           | 705/36 R    |
| 6,850,895 | B2 | * | 2/2005  | Brodersen | G06Q 10/06  |
|           |    |   |         |           | 705/7.14    |
| 6,963,826 | B2 | * | 11/2005 | Hanaman   | G06Q 10/0875|
|           |    |   |         |           | 703/2       |
| 6,975,999 | B2 | * | 12/2005 | Moore     | G06Q 30/02  |
|           |    |   |         |           | 705/7.13    |
| 7,174,301 | B2 | * | 2/2007  | Florance  | G06Q 10/025 |
|           |    |   |         |           | 705/313     |
| 7,308,704 | B2 | * | 12/2007 | Vogel     | G06F 21/604 |
|           |    |   |         |           | 726/1       |

(Continued)

OTHER PUBLICATIONS

AlignStar—Professional Territorial Design Software Datasourtech. com, 2003 (Year: 2003).*

(Continued)

*Primary Examiner* — Scott L Jarrett
(74) *Attorney, Agent, or Firm* — Standley Law Group LLP

(57) ABSTRACT

A system and method for facilitating the identification of potential sales targets by tracking and providing sales target and sales data in an interactive, unified, graphical and coded fashion. The system is adapted to assist sales associates traveling in the field to identify sales targets, and their sales potential, easily, interactively, graphically, and in a unified manner. The specific structure and layout of the graphical user interface provides new functionality to the user and aids the user in quickly and efficiently providing a graphical and unified map view of potential sales targets coded by icon shape and color, where the color of the icon is determined by the sales potential of the sales target.

16 Claims, 19 Drawing Sheets
(12 of 19 Drawing Sheet(s) Filed in Color)

(56) References Cited

U.S. PATENT DOCUMENTS

| | | | |
|---|---|---|---|
| 7,340,410 B1* | 3/2008 | Vaillancourt | G06Q 10/063114 705/7.15 |
| 7,447,700 B1* | 11/2008 | Behera | G06F 16/2458 |
| 7,620,564 B1* | 11/2009 | Lippock | G06Q 30/0201 705/7.29 |
| 7,974,865 B2* | 7/2011 | Patnaik | G06Q 10/0631 705/7.12 |
| 8,015,038 B2* | 9/2011 | Gennaro | G06Q 10/063 705/7.11 |
| 8,315,791 B2* | 11/2012 | Bales | G01C 21/367 340/989 |
| 8,510,659 B2* | 8/2013 | Lam | G06Q 10/067 715/734 |
| 8,626,572 B2* | 1/2014 | Colliat | G06Q 30/0201 705/35 |
| 8,799,796 B2* | 8/2014 | Ehrler | G06F 3/0481 715/763 |
| 8,812,345 B2* | 8/2014 | Cragun | G06Q 30/02 705/7.31 |
| 9,230,351 B2* | 1/2016 | Dodgen | G06F 3/048 |
| 9,400,958 B2* | 7/2016 | B'Far | G06Q 10/00 |
| 9,626,637 B2* | 4/2017 | Winters | G06Q 10/06311 |
| 9,760,237 B2* | 9/2017 | Eraker | G06Q 30/00 |
| 10,108,974 B1* | 10/2018 | Shariff | G06Q 30/0205 |
| 10,140,743 B2* | 11/2018 | Hochmuth | G09G 5/377 |
| 2001/0033284 A1* | 10/2001 | Chan | G06T 11/00 345/441 |
| 2004/0138944 A1* | 7/2004 | Whitacre | G06Q 10/06398 705/7.42 |
| 2004/0139102 A1* | 7/2004 | Vierich | G06F 16/2425 |
| 2005/0102284 A1* | 5/2005 | Srinivasan | G06F 16/2428 |
| 2005/0131710 A1* | 6/2005 | Sahagian | G06Q 10/06398 705/1.1 |
| 2005/0231392 A1* | 10/2005 | Meehan | G06Q 10/10 340/995.1 |
| 2005/0278286 A1* | 12/2005 | Djugash | G06F 16/2423 |
| 2006/0167704 A1* | 7/2006 | Nicholls | G06Q 10/06393 705/7.39 |
| 2006/0200383 A1* | 9/2006 | Arutunian | G06Q 30/02 705/14.56 |
| 2007/0043609 A1* | 2/2007 | Imam | G06Q 10/06 705/7.15 |
| 2008/0034314 A1* | 2/2008 | Louch | G06F 8/60 715/778 |
| 2008/0195930 A1* | 8/2008 | Tolle | G06F 16/904 715/227 |
| 2008/0312987 A1* | 12/2008 | Damodaran | G06Q 10/0633 705/7.27 |
| 2009/0319931 A1* | 12/2009 | Hutchings | G06F 3/0481 715/771 |
| 2010/0228752 A1* | 9/2010 | Folting | G06F 17/246 707/758 |
| 2011/0205231 A1* | 8/2011 | Hartley | G06Q 40/00 345/440 |
| 2011/0208562 A1* | 8/2011 | Hartley | G06Q 30/02 705/7.33 |
| 2011/0225525 A1* | 9/2011 | Chasman | G06F 3/0486 715/763 |
| 2011/0283231 A1* | 11/2011 | Richstein | G06F 3/0488 715/810 |
| 2012/0297327 A1* | 11/2012 | Chow | G09B 29/007 715/765 |
| 2013/0111321 A1* | 5/2013 | Dorrell | G06F 9/44 715/215 |
| 2013/0179225 A1* | 7/2013 | Nadiadi | G06F 3/0481 705/7.34 |
| 2013/0339291 A1* | 12/2013 | Hasner | G06F 16/283 707/601 |
| 2014/0033120 A1* | 1/2014 | Bental | G06Q 30/02 715/803 |
| 2014/0081903 A1* | 3/2014 | Koosel | G06F 16/254 707/602 |
| 2014/0149836 A1* | 5/2014 | Bedard | G06F 17/2247 715/212 |
| 2014/0164038 A1* | 6/2014 | Maughan | G06Q 10/06311 705/7.13 |
| 2014/0208215 A1* | 7/2014 | Deshpande | G06Q 10/00 715/736 |
| 2015/0287119 A1* | 10/2015 | Bhan | G06O 30/0629 705/5 |
| 2015/0310466 A1* | 10/2015 | LaCivita | G06Q 30/0205 705/7.34 |
| 2016/0103592 A1* | 4/2016 | Prophete | G06F 3/04845 715/771 |
| 2017/0069118 A1* | 3/2017 | Stewart | G06F 3/04845 |
| 2017/0083589 A1* | 3/2017 | Pominville | G06F 16/248 |
| 2017/0286449 A1* | 10/2017 | Strube | G06F 3/0482 |
| 2018/0130152 A1* | 5/2018 | Holbrook | G06Q 50/16 |

OTHER PUBLICATIONS

Cravens, David W., An Analytical Approach for Evaluating Sales Territory Performance Journal of Marketing, Jan. 1972, vol. 36 (Year: 1972).*

Channin, Jason, ArcGIS Business Analyst—An Introduction ESRI, Sep. 2007 (Year: 2007).*

Cognos 8 Business Intelligence—Report Studio—User Guide Cognos, 2006 (Year: 2006).*

Ergometrics.com Web Pages Ergometics.com, Mar. 2000, Retrieved from Archive.org (Year: 2000).*

Miller, Fred, GIS Tutorial for Marketing—Chapter 9—Managing Sales Territories ESRI Press, 2007 (Year: 2007).*

ZS Associates—MAPS Territory Alignment www.zassociates.com, 2002, Retrieved from Archive.org (Year: 2002).*

Oracle Sales Analytics—Data Sheet Oracle, 2011 (Year: 2011).*

Oracle Business Intelligence Publisher—Report Designer's Guide Oracle, Aug. 2008 (Year: 2008).*

Oracle Territory Management, User Guide Oracle, Apr. 2003 (Year: 2003).*

Prabhankant, Sinha et al., Sales-force decision models: Insights from 25 years of implementation Interfaces, May/Jun. 2001, vol. 31, No. 3 (Year: 2001).*

Li, Miranda, Tableau on Tableau: 5 Ways We Look at Our Sales Data Tableau.com, Sep. 9, 2015 (Year: 2015).*

Tell a story with your map-enabled BI dashboard ArcGIS Blog, Mar. 31, 2015 (Year: 2015).*

Territory Design ESRI, Dec. 2010 (Year: 2010).*

Charles, Erik W. et al., Track Sales Performance ACA News, vol. 43, No. 3, Mar. 2000 (Year: 2000).*

\* cited by examiner

MAP BASED GRAPHICAL USER INTERFACE FOR IDENTIFYING SALES TARGETS AND DETERMINING SALES POTENTIAL

BACKGROUND OF THE INVENTIVE FIELD

The present invention is directed to a system and method for facilitating the identification of potential sales targets by tracking and providing sales target and sales data in an interactive, unified, graphical and coded fashion. Currently there is no system or solution for sales associates traveling in the field to identify sales targets, and their sales potential, easily, interactively, graphically, and in a unified manner. For example, the specific structure and layout of the graphical user interface provides new functionality to the user and aids the user in quickly and efficiently:

providing a graphical and unified map view of potential sales targets coded by icon shape and color, where the color of the icon is determined by the sales potential of the sales target.

filtering and customizing the graphical and unified map view of the sales targets by numerous factors (e.g., for example for foundry sales targets filtering and displaying sales targets by sales representative(s), sales territory(s), state/region(s), business line(s), sales potential, industry/sector(s), metal type(s), molding process, core making process). For example, displaying a list of sales associates, each name adapted to be selected by the user, and in response to being selected by the user, filtering the sales target data and displaying only those sales targets associated with the selected sales associate (s).

providing a selectable icon with a company logo that when selected customizes the graphical view by changing the icon shape to a company logo for each sales target that is a customer of the company;

customizing the graphical view by using a color-coded toggle tool for assigning different colors to different sales associates.

providing a "dashboard" feature that provides a unified view of specific sales target data in a graphical fashion including graphical bar graphs of estimated sales for each sales target versus full potential sales for each sales target, and actual sales for each sales target versus potential sales for each target (broken down by a predetermined time period and by product lines). This dashboard functionality appears over only a portion of the graphical map of the sales region and the system is adapted to change the contents of the dashboard based on the specific sales target selected on the graphical map. In this fashion, the user sees a graphical, color-coded and unified view of relevant sales targets and relevant sales data for selected targets.

providing a selectable circle graph with three concentric lines, one line showing the actual sales for the selected sales target, one line showing estimated sales for the selected sales target, and the third line showing potential sales for the selected sales target, where each line is illustrated in a different color from the other lines.

providing a pop-up window reached from selecting the selectable circle graph, the window appearing partially above the dashboard and graphical map, that provides a graphical view of actual sales for the selected sales target, the estimated sales for the selected target and potential sales for the selected target in one unified view broken down by product line. The system is also adapted so that each product line is selectable by the user so that when selected, sales information for specific products is provided.

providing a reporting functionality accessible from the dashboard interface for allowing users to report new sales data relating to the specific target that is currently being displayed on the dashboard.

dynamically providing the data provided in the graphical map and dashboard ("dynamically" meaning that once new data is supplied (e.g. a user modifies the potential within reporting center)). The data is automatically applied within the map and dashboard. For example, the color of the sales target icon will change automatically based on the sales potential reported by the user.

Furthermore, currently there is no system or solution to effectively track sales target visits by sales associates traveling in the field or to track and determine sales effectiveness by associating sales visits to sales data. The system of the present invention provides a solution to this problem by providing an interactive and graphical view of sales visit information broken down by date or sales territory. The system also allows the user to filter the sales visit information by sales target(s) or sales associate(s). For example, the specific structure and layout of the graphical user interface provides new functionality to the user and aids the user in quickly and efficiently:

tracking sales visits, preferably by satellite global positioning systems (GPS) in the mobile devices of the sales associates.

providing a graphical view of the sales visits filterable by foundry(s) and/or sales associate(s).

providing a graphical view of sales effectiveness by providing a graph showing sales data for sales targets, the system adapted to draw a line on the graph indicating the number of visits to each sales target. In one embodiment, the sales data shown graphically can be in the form of a bar broken down by actual sales versus potential sales and where the graph can be customized to show this information over a predetermined period (annual, quarterly, monthly, weekly).

SUMMARY OF THE GENERAL INVENTIVE CONCEPT

In one embodiment of the invention, the invention is comprised of: a graphical user interface having an image of a sales region for displaying on a screen; a processing system, the processing system programmed with instructions for executing on the processing system for: displaying on the sales region, a plurality of selectable icons representing the location of potential sales targets; dynamically displaying a first subset of the plurality of selectable icons in a first color, the first color representing sales potential in a first predetermined monetary range; dynamically displaying a second subset of the plurality of selectable icons in a second color, the second color representing sales potential in a second predetermined monetary range, the second predetermined monetary range being lower than the first predetermined monetary range; in response to a selection of a particular one of the plurality of selectable icons, displaying in a first location on the screen a first window; displaying in the first window a summary data region providing information relating to the sales target associated with the selected particular icon; displaying in the first window a sales data region; dynamically displaying in the sales data region sales data relating to the sales target associated with the selected particular icon.

The foregoing and other features and advantages of the present invention will be apparent from the following more detailed description of the particular embodiments, as illustrated in the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

The following detailed description of the example embodiments refers to the accompanying figures that form a part thereof. The detailed description provides explanations by way of exemplary embodiments. It is to be understood that other embodiments may be used having mechanical and electrical changes that incorporate the scope of the present invention without departing from the spirit of the invention.

Figure 1:
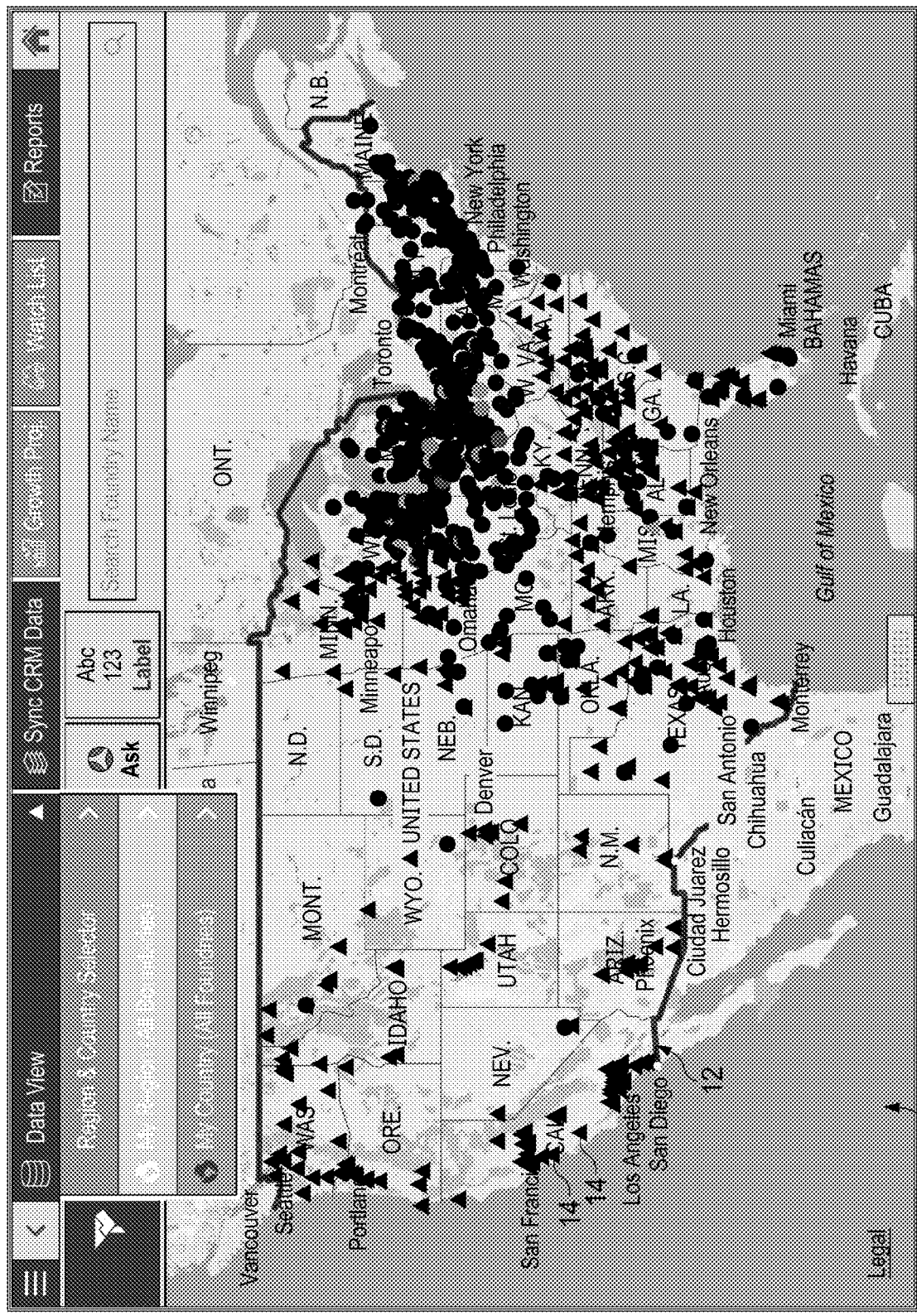
FIG. 1 illustrates one embodiment of a graphical user interface of the present invention showing an image of a sales region and sales target locations.

FIG. 1 illustrates one embodiment of a graphical user interface 10 of the present invention showing an image of a sales region 12 and sales target locations 14. In this embodiment, the sales targets are foundry locations shown by triangles or circles. The triangles represent foundry locations that are distributor-based sales targets (e.g., the company goes through a distributor to make sales to these targets). The circles represent foundry locations that are non-distributor based (e.g., the company sells directly to these sales targets). In the preferred embodiment, the sales targets are represented by selectable icons. The sales target icons are displayed on the map according to their respective geographic location.

In this embodiment, the system dynamically displays a first subset of the plurality of selectable icons in a first color, the first color representing sales potential in a first predetermined monetary range. For example, the first color may be green indicating those sales targets in green color have the highest sales potential (e.g., above $1,000,000). The system also dynamically displays a second subset of the plurality of selectable icons in a second color, the second color representing sales potential in a second predetermined monetary range (e.g., $500,000-$999,999), the second predetermined monetary range being lower than the first predetermined monetary range. It is appreciated that the system can be programmed to code the sales target icons based on various different monetary ranges representing sales potential of the sales targets. For example, a third color can be used to indicated sales targets with sales potentials between $100,000-$499,999. A fourth color can be used to indicate sales targets with sales potentials between $50,000-$99,999. A fifth color can be used to indicate sales targets with sales potential between $0-$49,999, etc.

The graphical user interface provides a unified view of potential sales targets that provides a sales associate traveling on the road with an easy to use, interactive, graphical interface that quickly shows sales target information through coded shapes and colors. The structure of the interface allows the sales associate to quickly identify potential sales targets, to quickly differentiate sales targets, and to determine quickly which targets have the most sales potential. The interface of the present invention also provides the ability to select each of the sales target icons to access more detailed information about each of the sales targets. The more detailed information is also provided according to a specifically structured interface as described below. As illustrated in FIG. 1, a particular sales associate may filter the view by the entire region or the sales country assigned to the sales associate.

Figure 2:
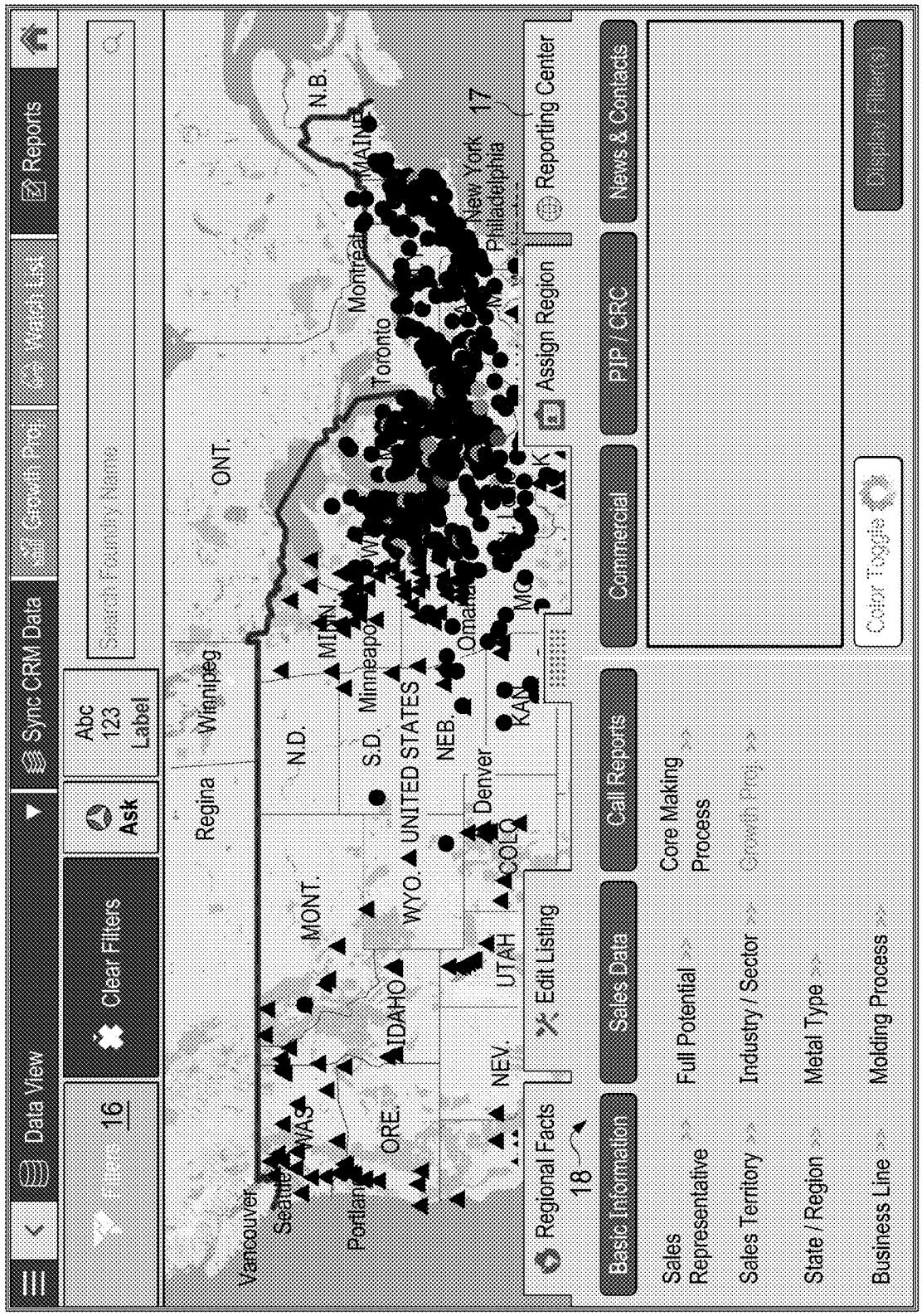
FIG. 2 illustrates one embodiment of a filter window of the present invention.

FIG. 2 illustrates one embodiment of the filter window of the present invention. In response to clicking on the "filter" icon 16, a filter window 18 pops up with a list of various filter factors such as sales representatives, sales potential, sales territory, state/region, industry served, metal type, product line, core making process and molding process. In response to selecting one of the plurality of selectable filter factors, the system is adapted to display, on the sales region, only those sales targets related to the selected filter factor. For example, the user can filter the display of sales targets to show only those targets within a particular range of sales potential. As another example, the user can filter the display of sales targets to show only those targets that use a certain type of molding process. Filtering in this manner assists the sales associate, for example, in determining which products the sales targets may be interested in (as certain molding processes use certain materials).

In response to selecting the sales potential filter factor, the system is adapted to display a plurality of selectable monetary ranges representing ranges of sales potential. In response to selecting a particular monetary range, the system is adapted to display on the sales region, only those sales targets with sales potential in the selected monetary range. For example, the system displays at least a first selectable range of sales potential (e.g., $1,000,000 and above) and a second selectable range of sales potential (e.g., $500,000 to $999,999). In response to selecting the first range of sales potential, the system will display, on the sales region of the graphical interface, only those sales targets that have a sales potential above $1,000,000.

The system preferably has a selectable reporting icon 17. In response to selecting the reporting icon, the system is adapted to display on the screen a reporting window having a plurality of locations for entering information about the selected sales target. Information entered or reported via these locations are stored in the system and the information is dynamically displayed on the image of the sales region and other locations of the graphical user interface as described below.

Figure 3:
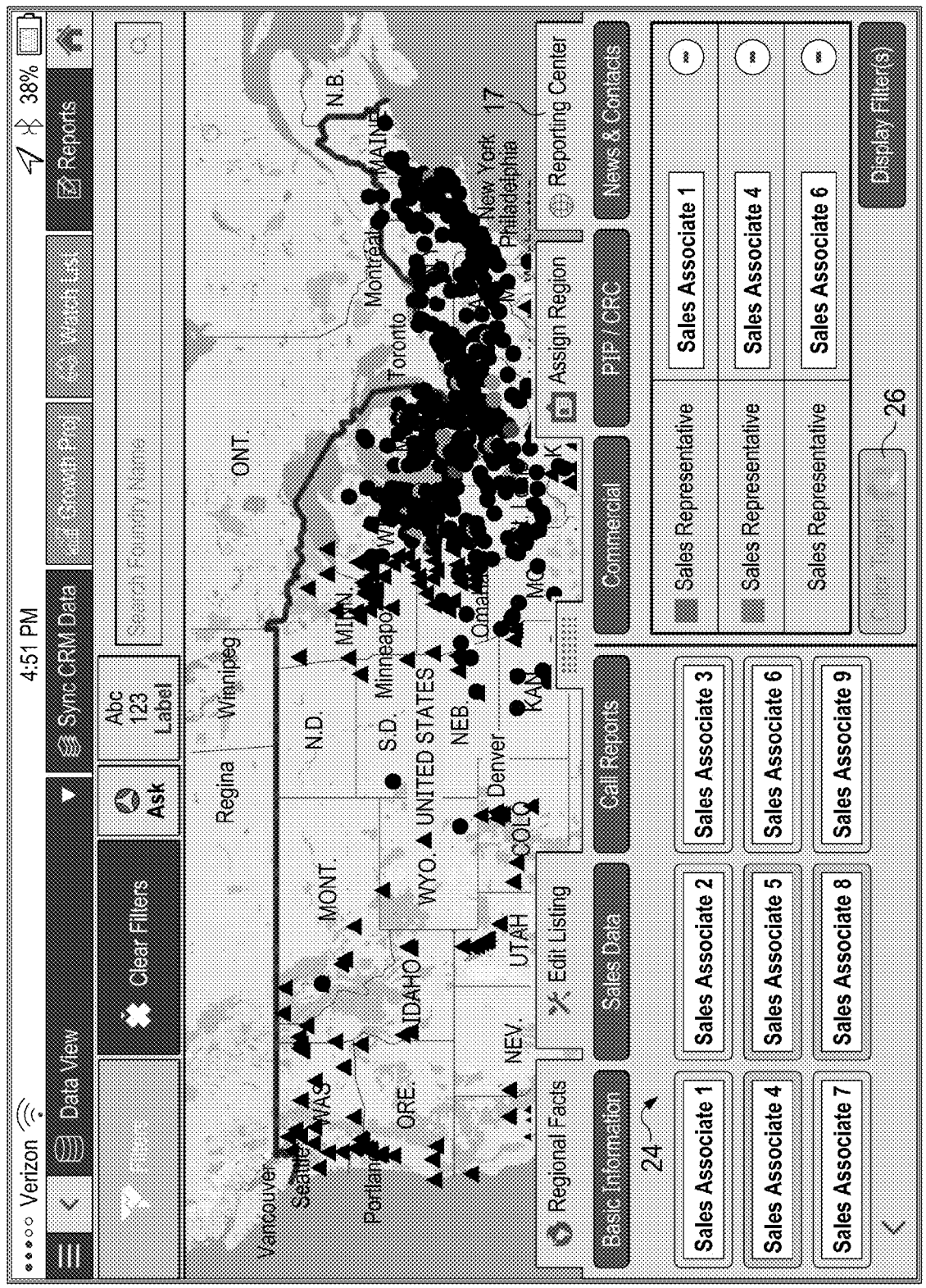
FIG. 3 illustrates one embodiment of a filter window for filtering based on sales associate(s)

FIG. 3 illustrates one embodiment of a filter window for filtering based on sales associate(s). In response to selecting the sales representative filter factor, the system is adapted to display a window 24 with a list of company sales associates/employees (for the purpose of this description, specific names of sales associates have not been used although that is the preferred embodiment—sales associates are herein referred to by an associate number). The user can select one sales associate or a plurality of sales associates from the list. For example, in response to selecting the selectable name of a sales associate, the system is adapted to display, on the sales region, only those potential sales targets that are assigned to the selected sales associate.

In one embodiment, the system is adapted to provide a color toggle feature 26 that assigns different colors to different sales associates. The system is adapted to display the sale target icons on the sales region screen in their assigned colors so that the user can easily ascertain from a quick glance the sales targets assigned to each selected sales associate. For example, if the user selects the name of a first sales associate and the name of a second sales associate from the list of sales associates, the system will filter the information and display, in a first color, all the sales targets associated with the first sales associate, and display, in a second color, all the sales targets associated with the second sales associate.

Figure 4:
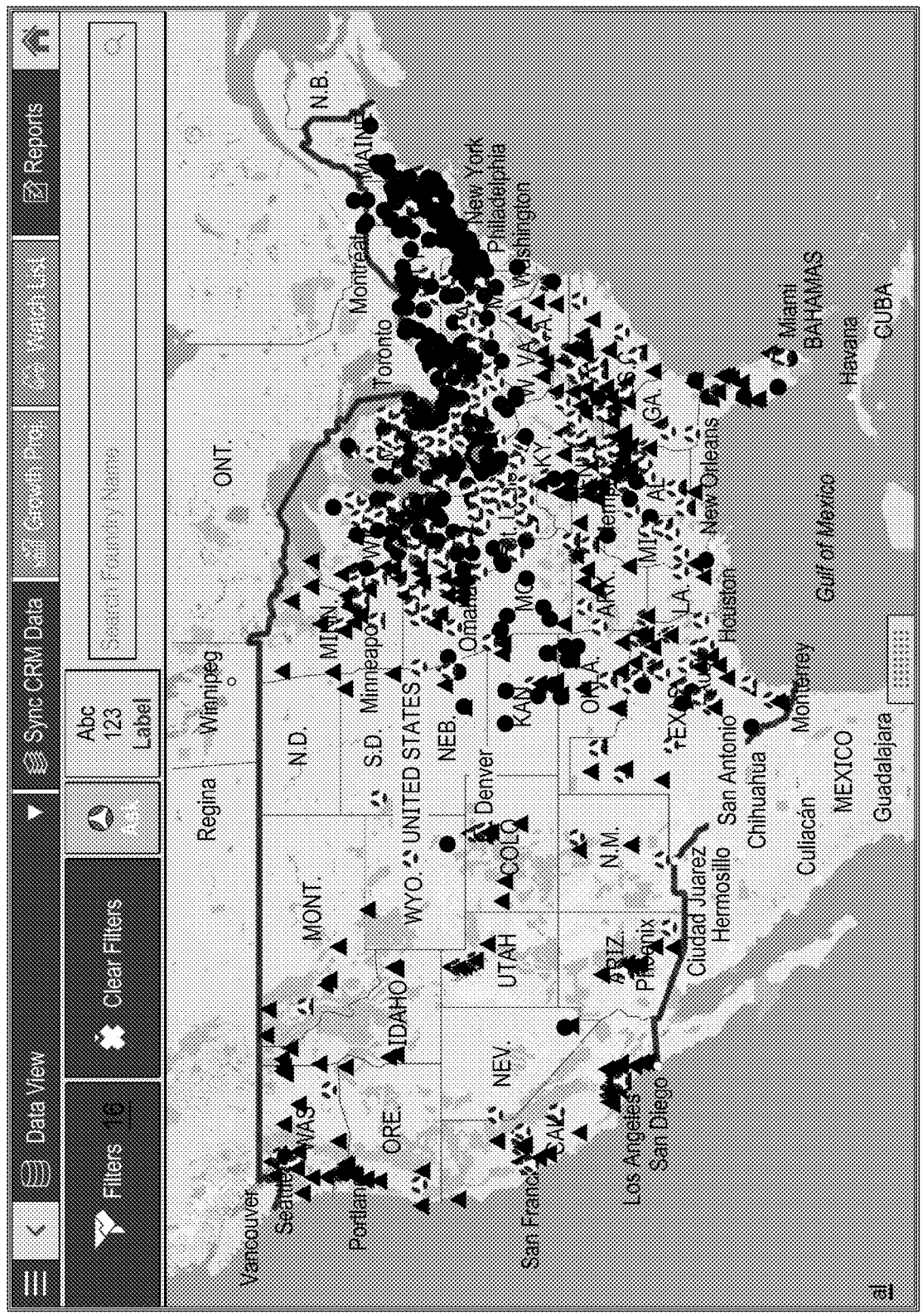
FIG. 4 illustrates one embodiment of the graphical user interface of the present invention showing customization to show existing customers or company sales targets.

FIG. 4 illustrates one embodiment of the graphical user interface of the present invention showing customization to show existing customers or company sales targets. For example, selecting the ASK company logo on the screen instructs the system to display all of the sales targets that are existing customers of the company. Specifically, the system changes sales target icons to the shape of the company logo for those sales targets that are already customers of the company.

Figure 5:
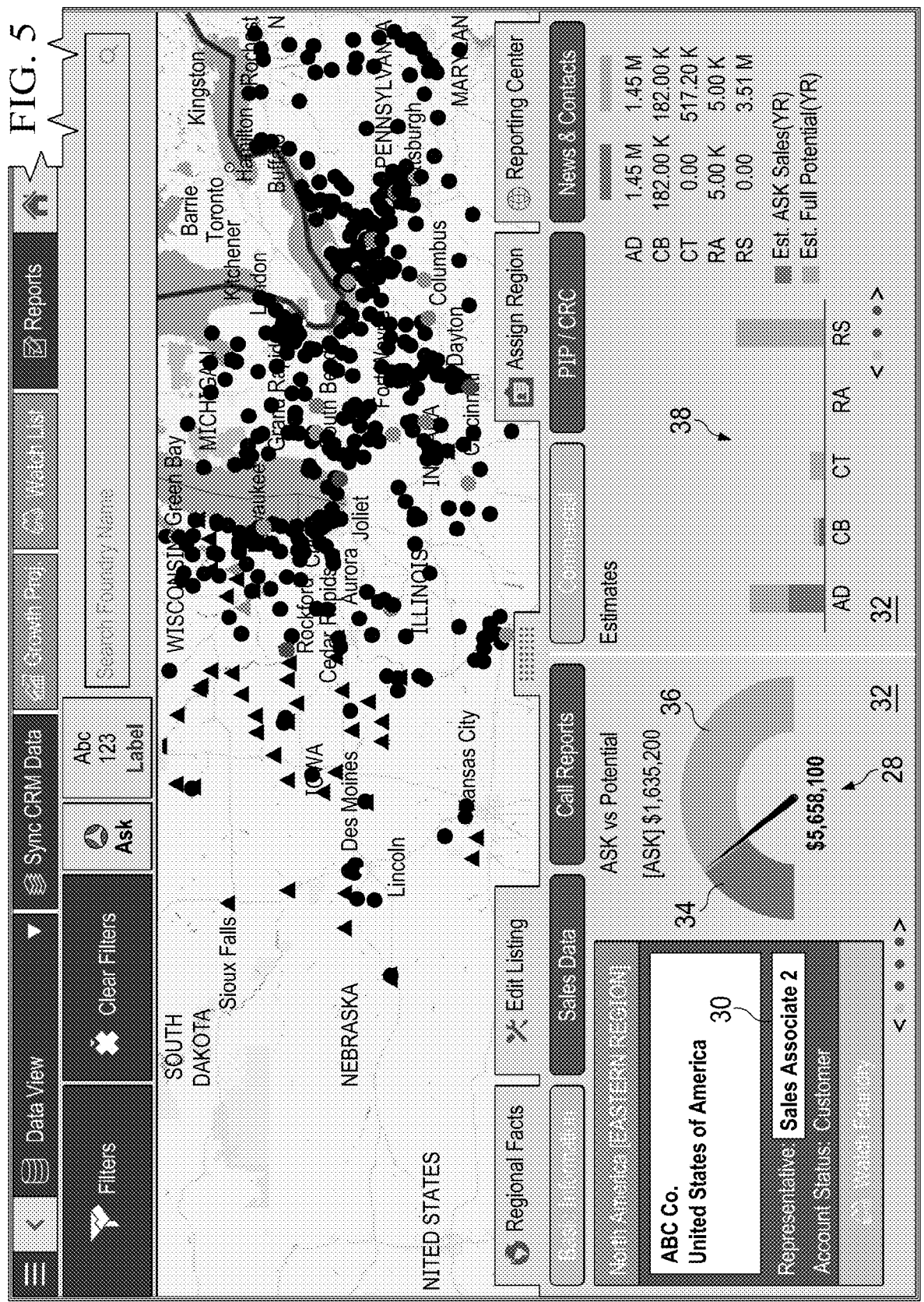
FIG. 5 illustrates one embodiment of a first window shown in response to selecting one of the sales target icons.

FIG. 5 illustrates one embodiment of a first window 28 shown in response to selecting one of the sales targets (represented by a selectable icon) on the sales region screen. The system is adapted to display in the first window a summary data region 30 providing information relating to the sales target associated with the selected particular icon. (In this example, ABC Co. is the selected sales target). The system is also adapted to display in the first window a sales data region 32 for dynamically displaying a first bar graph having a first bar portion 34 representing actual or estimated sales of the sales target associated with the selected sales target and a second bar portion 36 representing potential sales of the sales target associated with the selected icon. In the present application, "dynamically displaying" means to display the information automatically as the data it represents changes (in this embodiment, there is a short time lag between the time the data is changed to the time the data is displayed).

The system is also adapted to display in a second region in the first window a plurality of bar graphs 38, each of the plurality of bar graphs having first bar portion dynamically representing actual or estimated sales of a particular product line of a selected sales target and a second bar portion dynamically representing potential sales of the particular product line of the selected sales target. For the embodiment of FIG. 5, where the sales targets are foundries, the product lines are: release agents (RA), metallurgy (MT), cold box/epoxy (CB), inorganics (IN), additives (AD), risers and sleeves (RS), coatings (CT), no bake/hot box (NB), and filters (FT).

Figure 6:
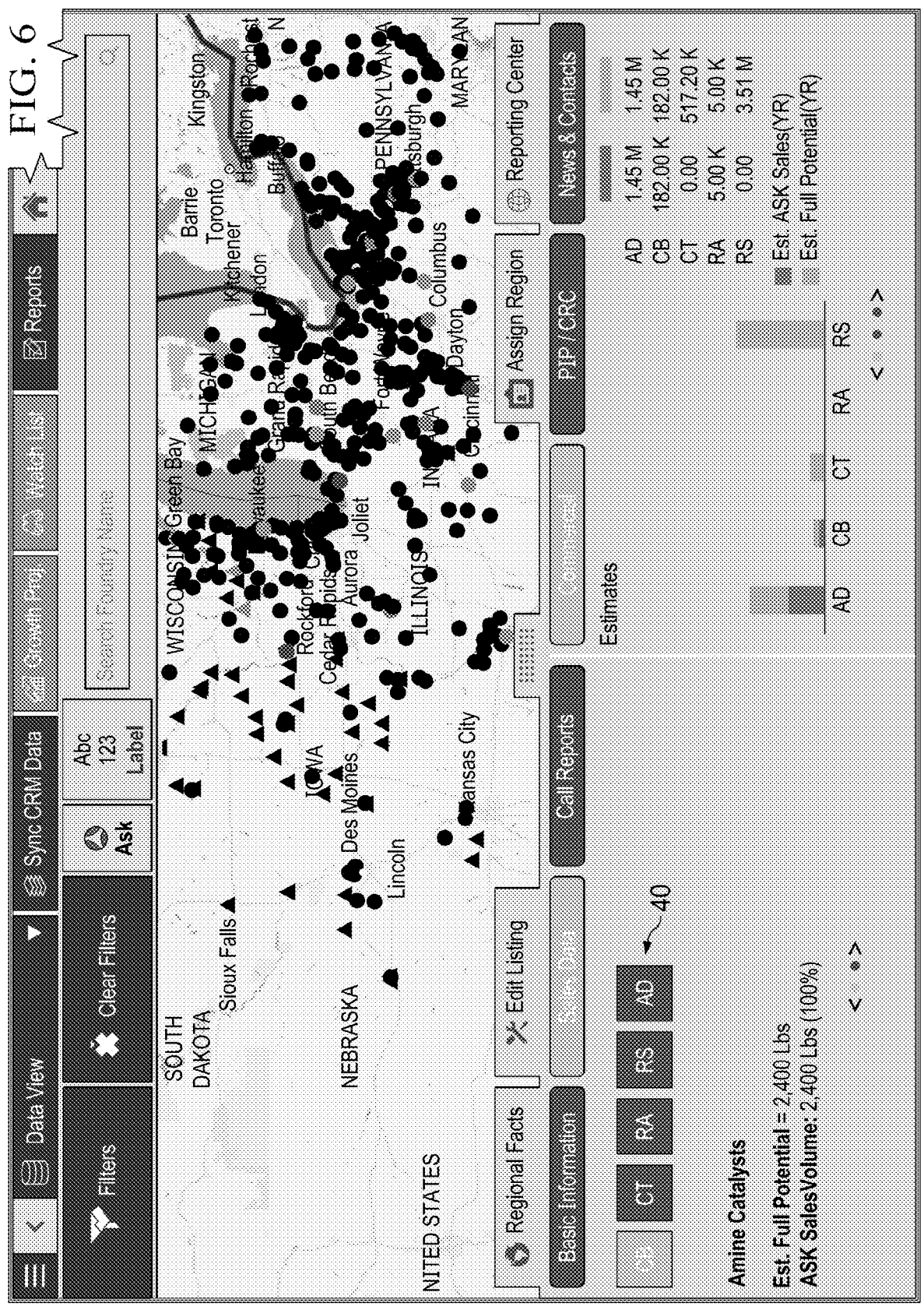
FIG. 6 illustrates one embodiment of the first window showing sales information for a selected sales target broken down by product line.

FIG. 6 illustrates one embodiment of the first window showing sales information for a selected sales target broken down by product line. The user can select other boxes 40 representing different product lines to view detailed sales information for the selected product line.

Figure 7:
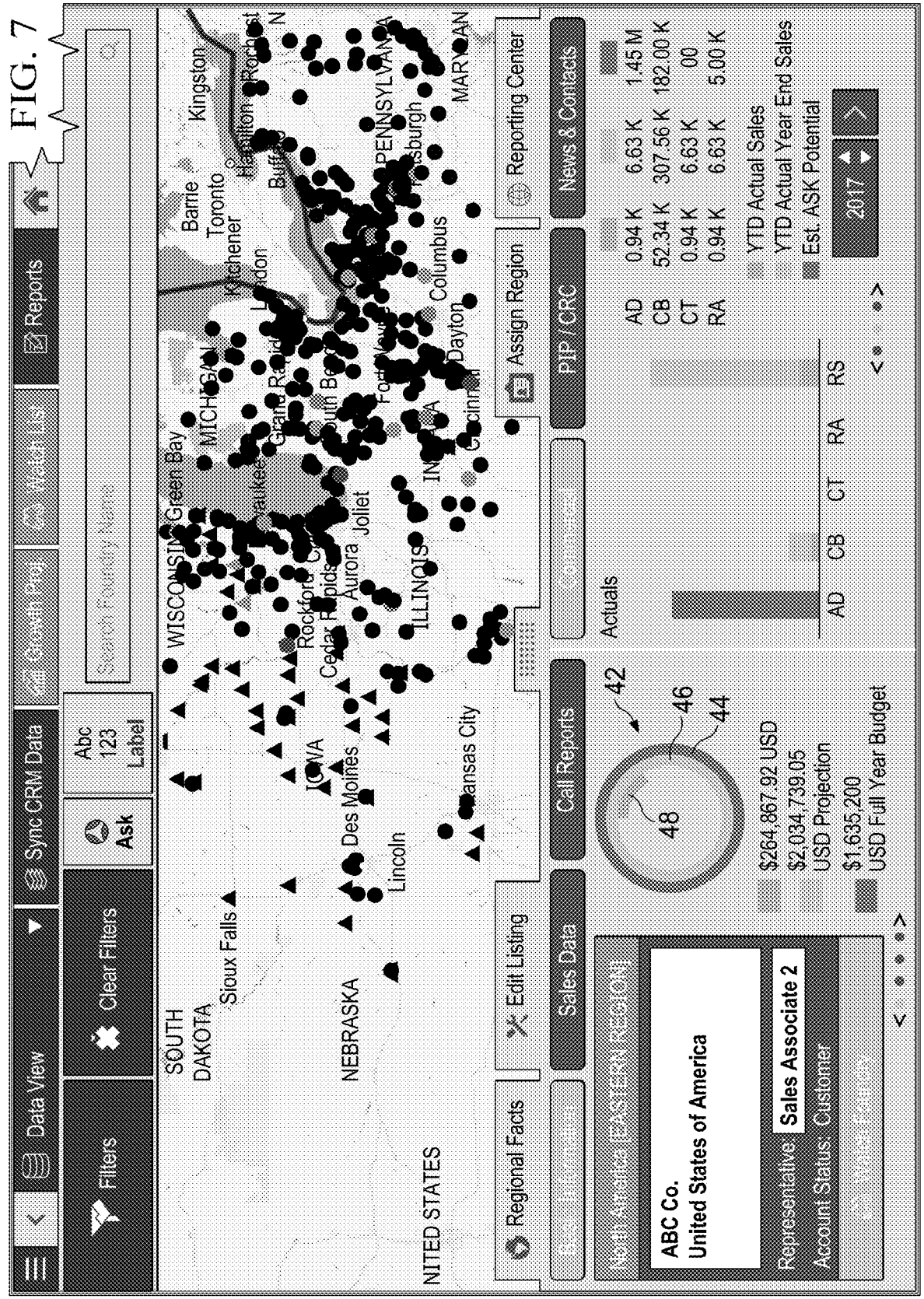
FIG. 7 illustrates one embodiment of the first window showing sales data of the selected sales target in graphical form.

FIG. 7 illustrates one embodiment of the first window showing sales data of the selected sales target in graphical form. As shown, sales data is depicted as a bar graph in a circular shape 42 and where the first bar portion 44 is concentric with second and third bar portions 46, 48 and wherein the first, second and third bar portions are all displayed in different colors. In this embodiment, the first bar portion (first color, e.g., blue) represents potential annual sales, the second bar portion (second color, e.g., yellow) represents estimated annual sales and the third bar portion (third color, e.g., green) represents actual year-to-date (ytd) sales.

Figure 8:
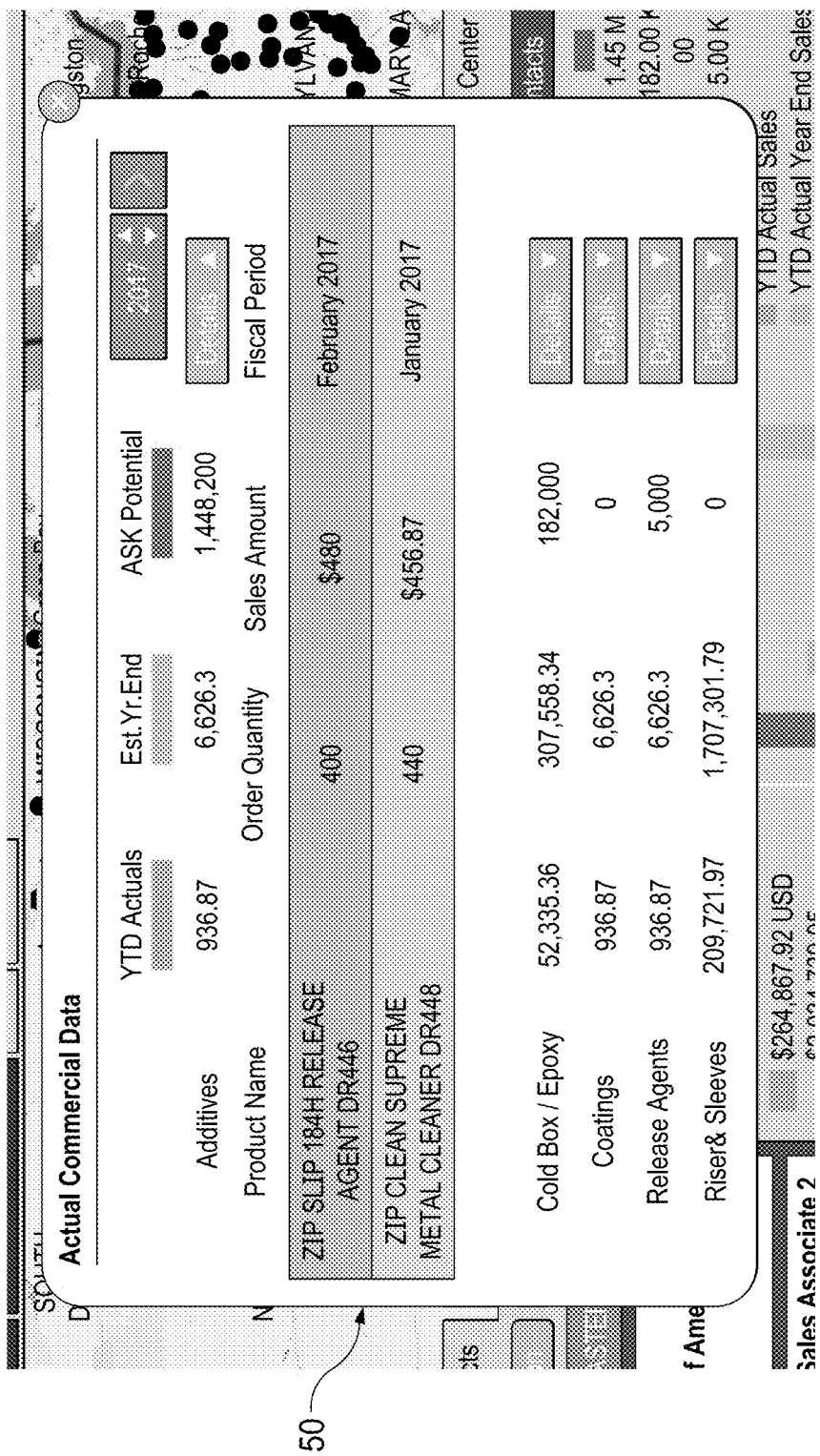
FIG. 8 illustrates one embodiment of another window of the present invention showing detailed sales data for a selected sales target.

In the preferred embodiment, the circle graph is selectable by the user. FIG. 8 illustrates one embodiment of another window of the present invention that is displayed in response to selecting the circle graph (e.g., clicking on it via a mouse device). This window named "actual commercial data" 50 provides more detailed sales data for the selected sales target. For example, this window provides actual, estimated, and potential sales for the selected sales target broken down by product line and by individual products. The user can also view the data over selectable data ranges.

Figure 9:
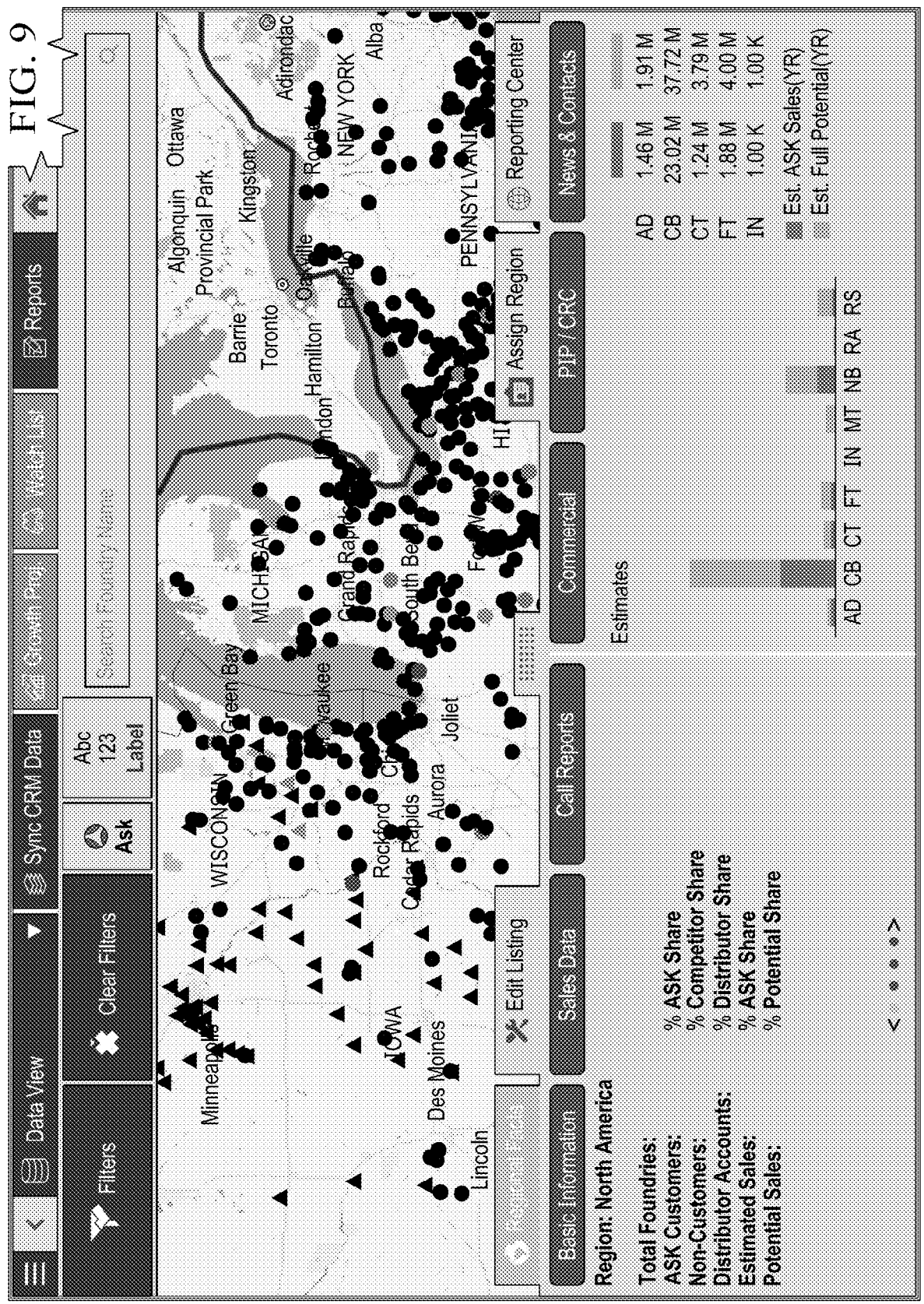
FIG. 9 illustrates one embodiment of the first window of the present invention showing regional information.

FIG. 9 illustrates one embodiment of the first window of the present invention showing regional information. As illustrated, this view provides information relating to the selected region. This view also provides sales data for the selected sales target broken down by product line.

Figure 10:
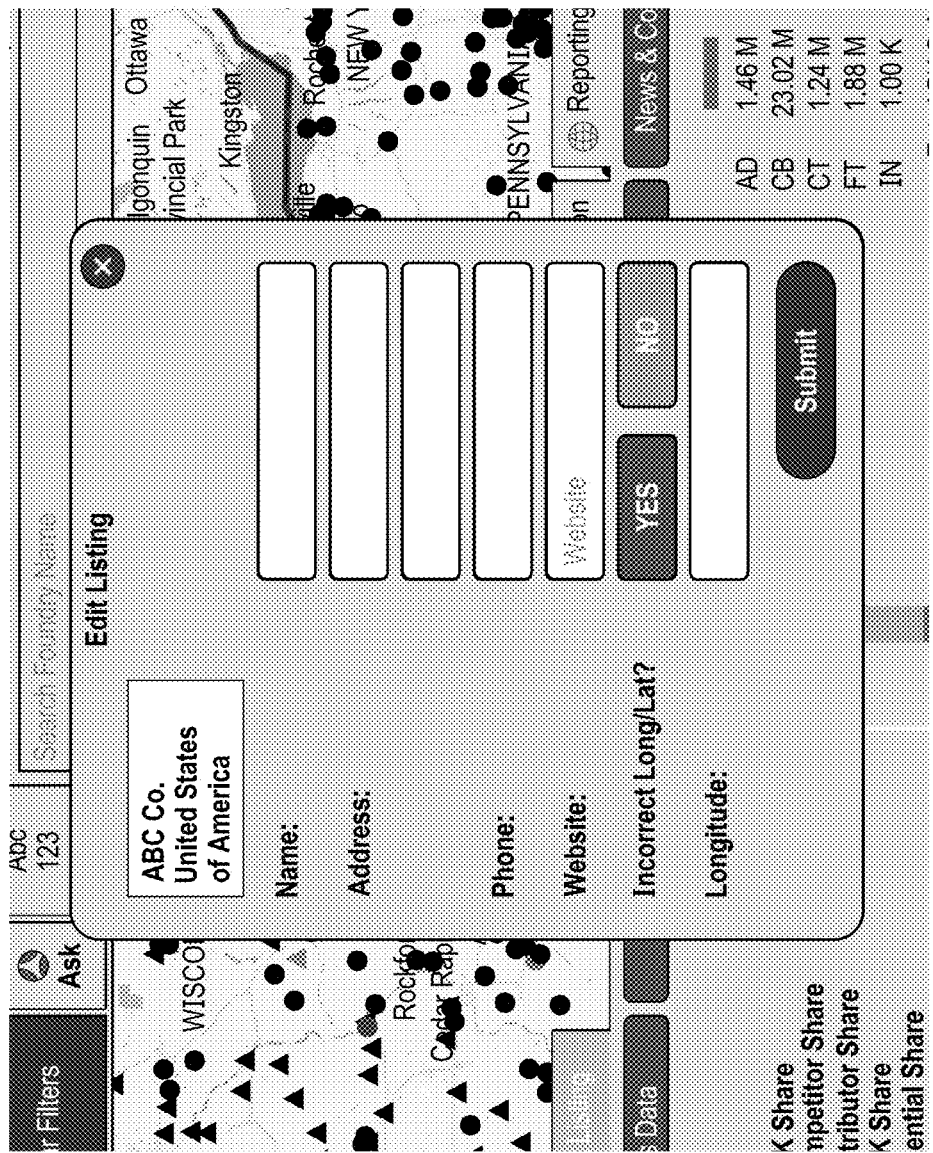
FIG. 10 illustrates one embodiment of the edit listing window of the present invention.
Figure 11:
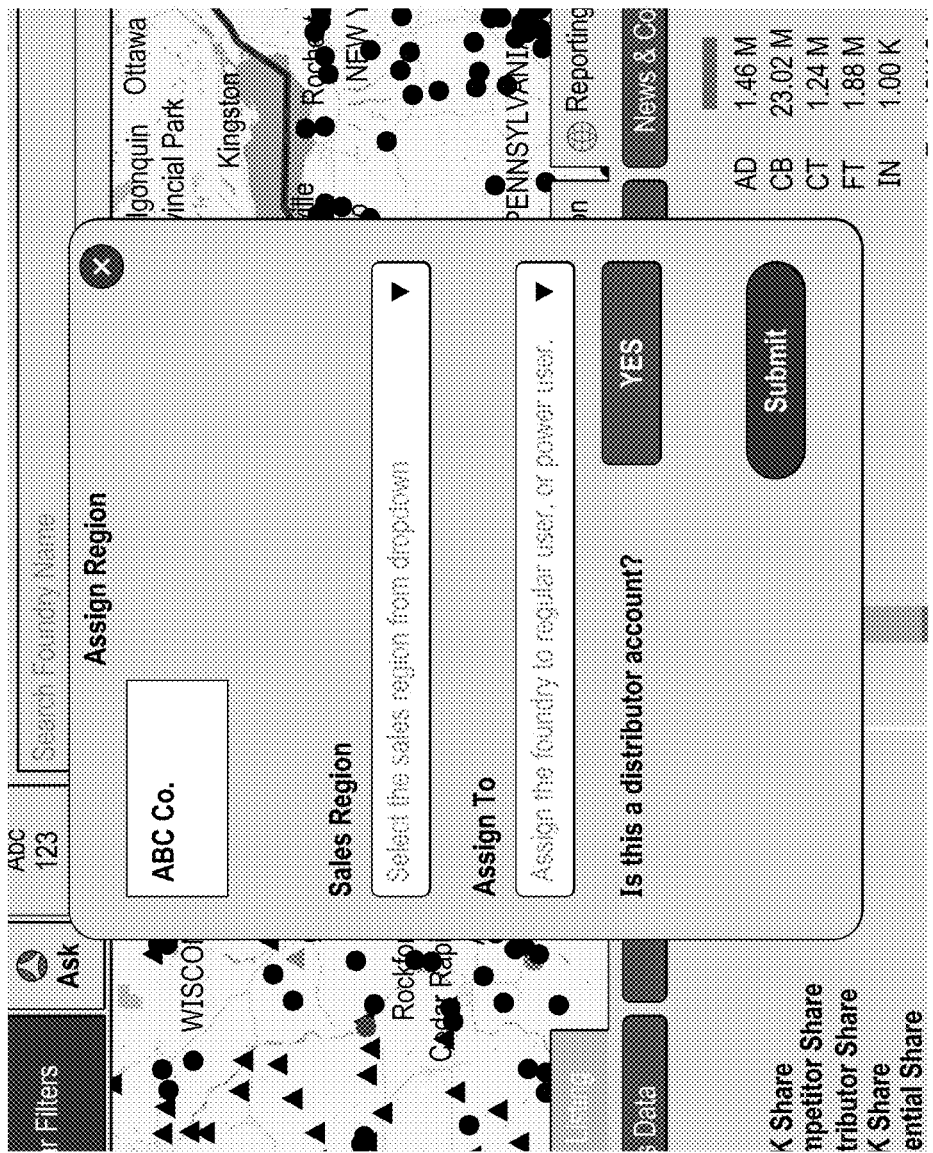
FIG. 11 illustrates one embodiment of the window for assigning sales associates to a particular region.

FIG. 10 illustrates one embodiment of the edit listing window of the present invention. This feature allows authorized users of the system to edit information relating to sales targets. FIG. 11 illustrates one embodiment of the window for assigning sales associates to a particular region.

Figure 12:
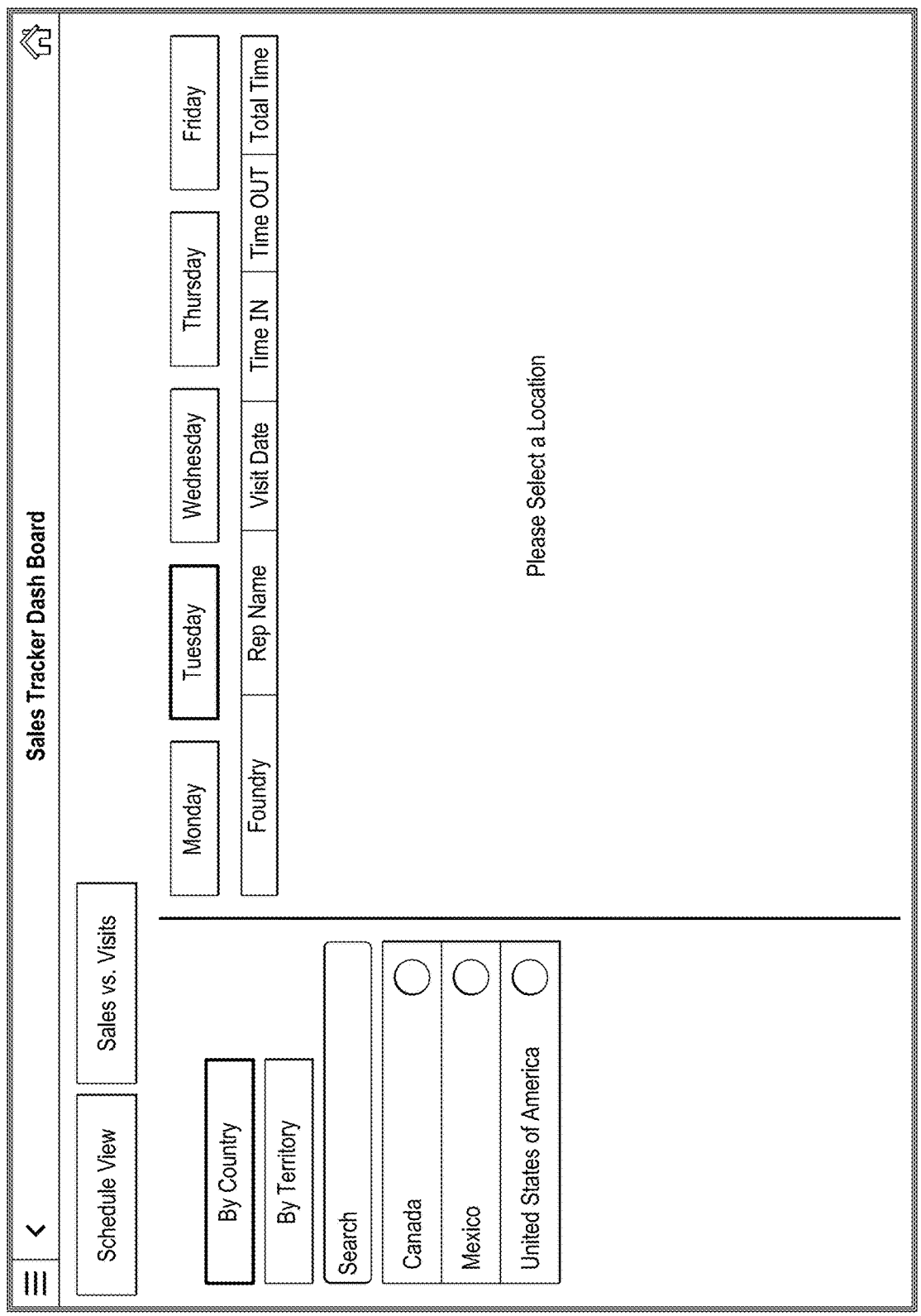
FIG. 12 illustrates one embodiment of the graphical user interface for tracking and displaying sales visit information.

FIG. 12 illustrates one embodiment of the graphical user interface for tracking and displaying sales visit information. As illustrated, sales visits to sales targets can be viewed by country and territory via a schedule view. In this view, sales visit information is displayed and viewed by day.

Figure 13:
FIG. 13 illustrates one embodiment of the graphical user interface of FIG. 12 showing a listing of sales visits based on sales targets.

FIG. 13 illustrates one embodiment of the graphical user interface of FIG. 12 showing a listing of sales visits based on sales targets (in this embodiment, the sales targets are foundries). As illustrated, the system is adapted to list details of all sales visits made to sales targets on a particular day. In this embodiment, the system provides, sales target name, the name of the sales associate who made the visit, the day of the visit, and the time in and out for the visit.

Figure 14:
FIG. 14 illustrates one embodiment of the graphical user interface of FIG. 12 showing a listing of sales visits based on sales associates.

FIG. 14 illustrates one embodiment of the graphical user interface of FIG. 12 showing a listing of sales visits based on sales associates. The system is also adapted to list sales visits based on company sales associates. This view allows the user to view a list of sales visits made by company sales associates for a selected day.

Figure 15:
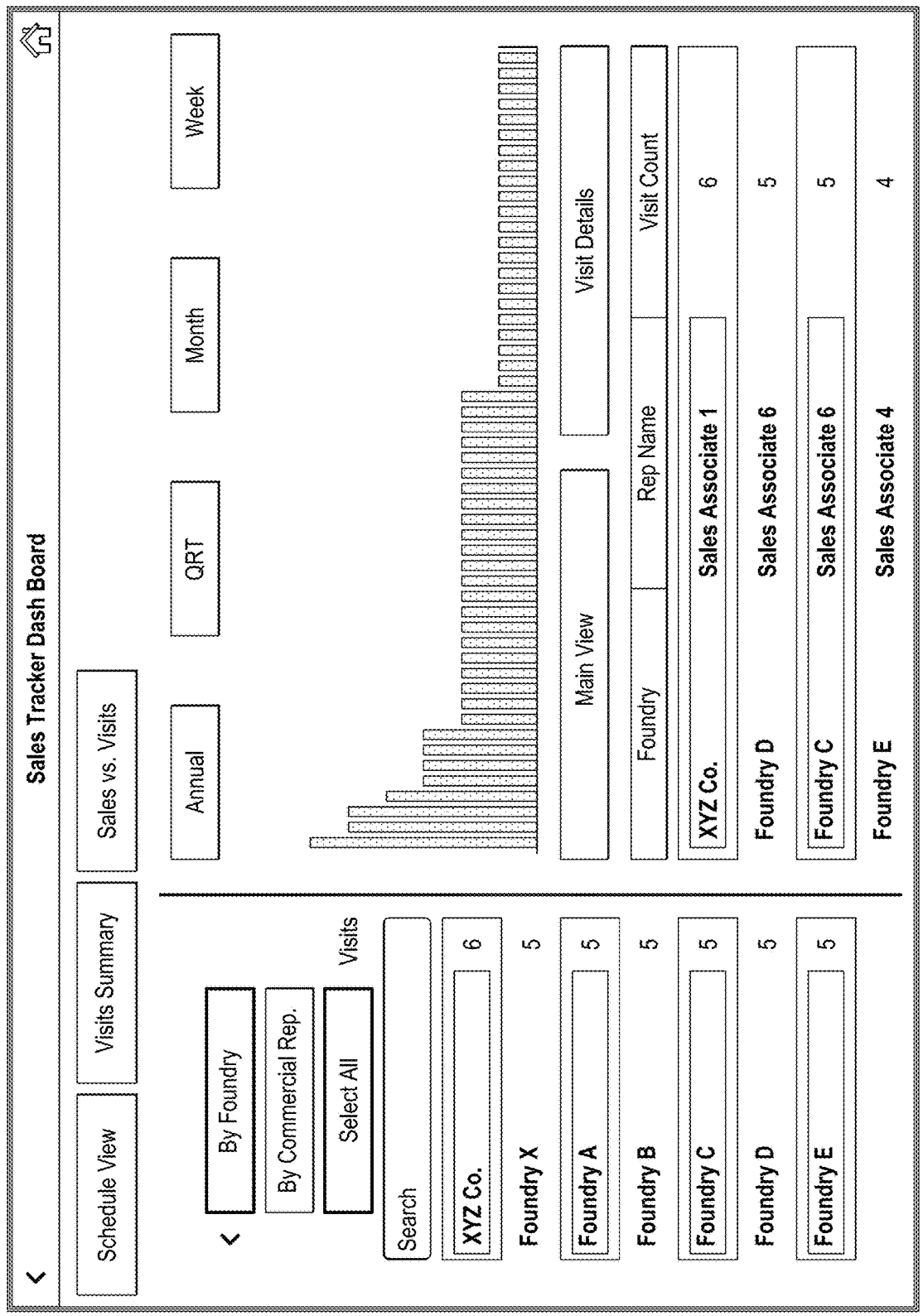
FIG. 15 illustrates one embodiment of the graphical user interface of FIG. 12 showing a graphical view of sales visits for a plurality of sales targets.
Figure 16:
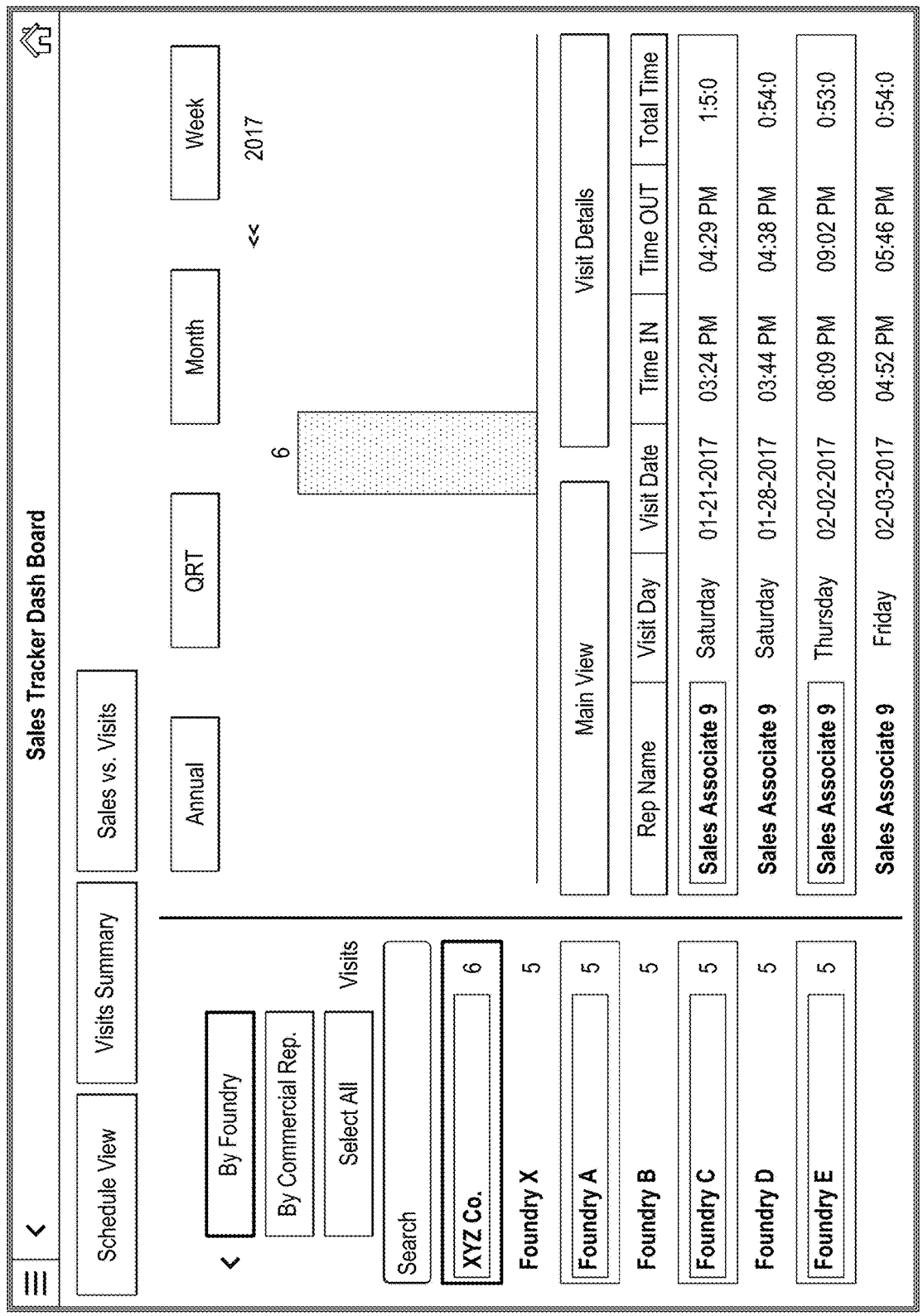
FIG. 16 illustrates one embodiment of the graphical user interface of FIG. 12 showing a graphical view of sales visits for a selected sales target.

FIG. 15 illustrates one embodiment of the graphical user interface of FIG. 12 showing a graphical view of sales visits for a plurality of sales targets. The view provides the number of sales visits made to each of the sales targets for a predetermined period of time (each bar in the graph represents data for a particular sales target and the length of the bar represents the number of visits made to the sales target). For example, the user can view the number of sales visits made to each of the sales targets per year, quarter, month or week. The system is adapted so that the user can select a particular sales target to obtain more detailed information about the sales visits (the sales target can be selected by clicking on the sales target in the left-hand column or by clicking on the bar representing the sales target). FIG. 16 illustrates one embodiment of the graphical user interface of FIG. 12 showing a graphical view of sales visits for a selected sales target (in this embodiment, XYZ Co. is the selected sales target). This view provides detailed information about each sales visit made to this selected sales target.

Figure 17:
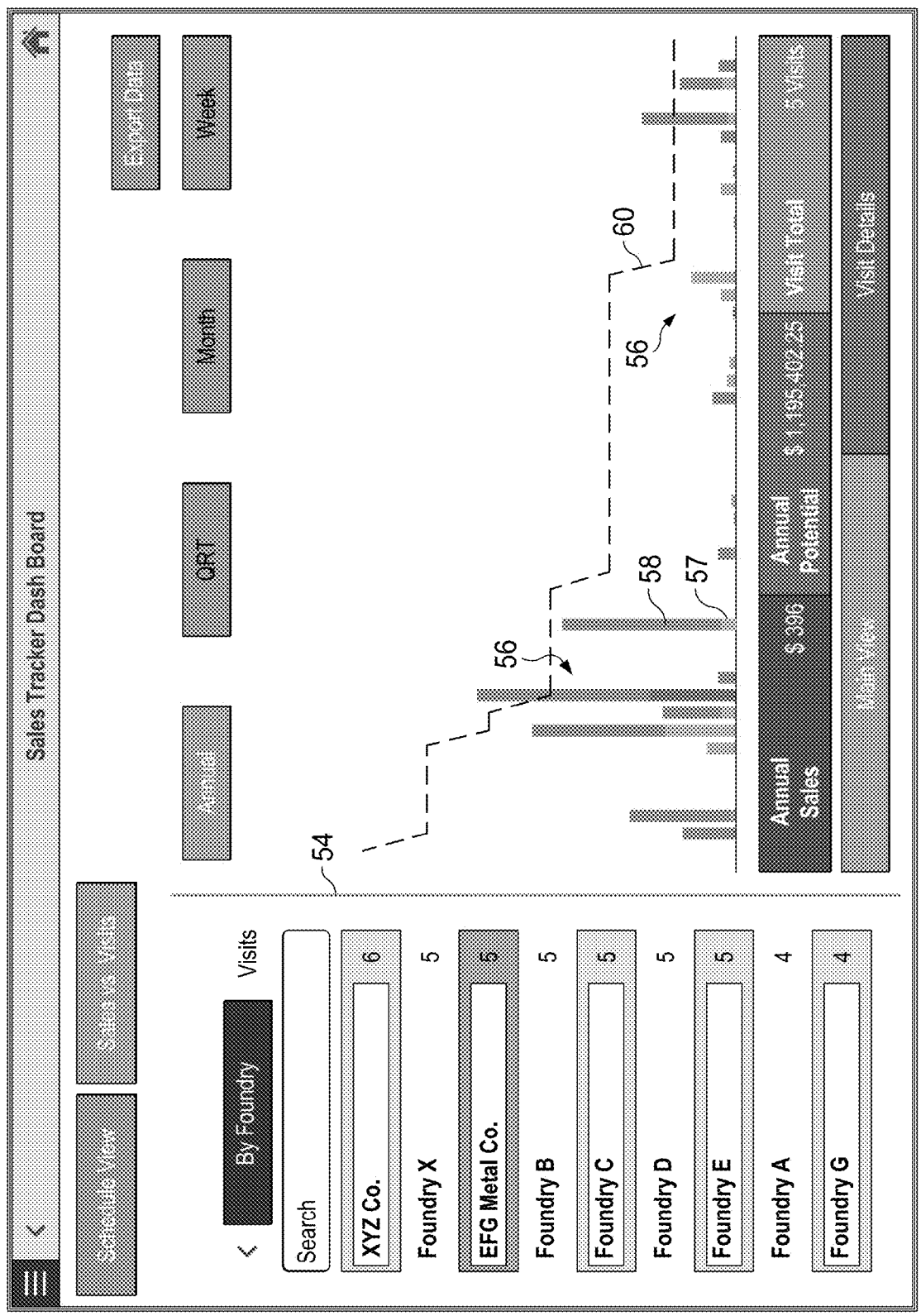
FIG. 17 illustrates one embodiment of the graphical user interface of FIG. 12 showing a graphical view of sales versus sales visits.

FIG. 17 illustrates one embodiment of the graphical user interface of FIG. 12 showing a graphical view of sales versus sales visits. The present invention tracks sales visits to a plurality of sales target locations and facilitates the identification of sales effectiveness by tracking sales versus sales visits. Sales visits to sales target locations are tracked via global positioning devices located in the mobile devices for each of the sales associates. The system stores location information for each of the sales targets and compares this information to the location of each of the sales associates to determine if a sales visit has been made to a sales target.

For example, the GPS devices in the mobile devices for each sales associate transmit location information to the processing system or server of the present invention. The processing system is programmed with instructions for executing on the processing system to: receive the location information sent from the global positioning devices; determine if the mobile devices are within a predetermined distance from one of the plurality of sales target locations; record the number of visits to each of the plurality of sales target locations; and associate one of the sales associates to each of the recorded number of visits (via Identification information sent with the GPS location information).

The system is adapted to display a graph on the graphical user interface, the graph having a first axis 54 for indicating the actual sales amounts for each of the plurality of sales target locations, a plurality of bars 56, each bar associated to one of the plurality of sales target locations. In this embodiment, each of the bars has a first portion 57 for representing the actual sales for each of the plurality of sales target locations for a predetermined time period and a second portion 58 for representing the potential sales for each of the plurality of sales target locations for a predetermined time period. The graph is also comprised of a line 60 perpendicular to the plurality of bars for representing the number of visits to each of the plurality of sales target locations. The system is adapted to dynamically display the plurality of bars and the line representing the number of visits to each of the plurality of sales target locations.

The plurality of bars are selectable, and wherein response to selecting a bar associated with a particular sales target location, the system is adapted to:
  a. list the sales visits to the selected sales target location for a predetermined period of time,
  b. display in a first region 62 the actual sales to the selected sales target location for a predetermined time period,
  c. display in a second region 64 the potential sales to the particular sales target location selected for a predetermined time period.

Figure 18:
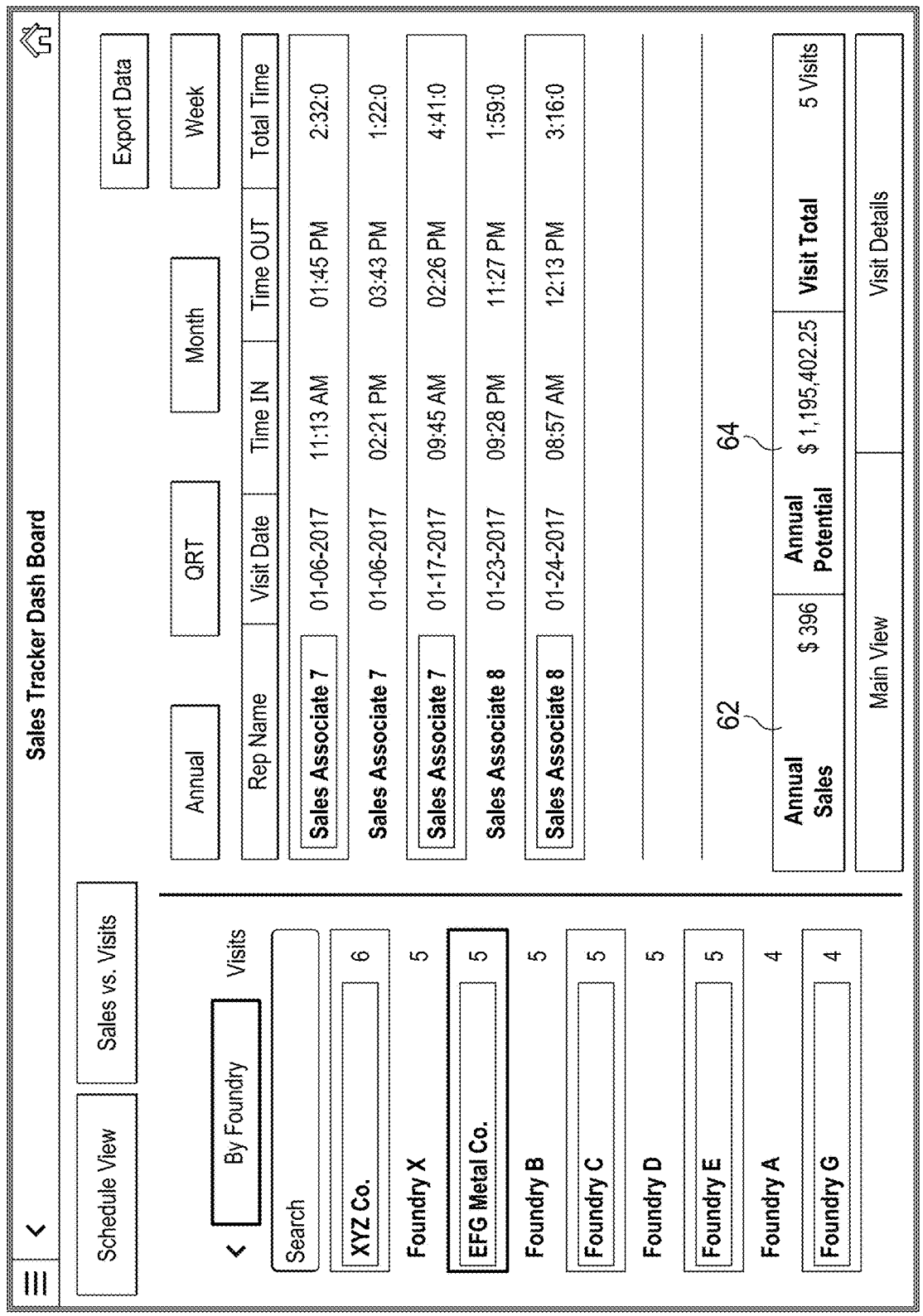
FIG. 18 illustrates one embodiment of the graphical user interface of FIG. 12 showing sales versus visits for a selected sales target.

FIG. 18 illustrates one embodiment of the graphical user interface of FIG. 12 showing sales versus visits for a selected sales target.

Figure 19:
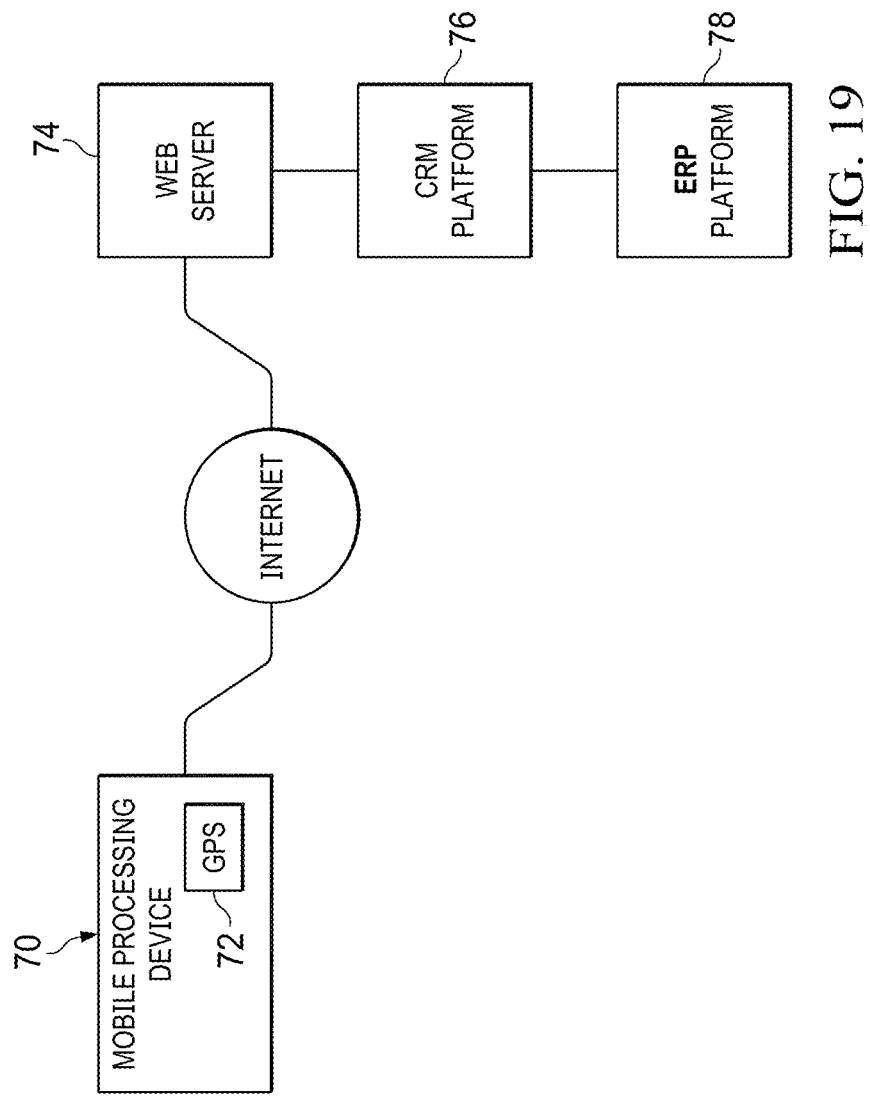
FIG. 19 illustrates a block diagram of one embodiment of the invention.

FIG. 19 illustrates a block diagram of one embodiment of the invention. The present system is comprised of a plurality of mobile processing devices 70, each having a GPS device 72 for sending location information, a Web server 74, a customer relationship management (CRM) platform 76, and an Enterprise Resource Planning (ERP) financial platform 78 for storing financial information.

In this embodiment, each of the sales associates can access the graphical user interface of the present invention on their mobile devices as they travel out in the field. Data can be sent to and from the CRM computing platform through the Internet and a Web server that acts as an intermediary between the mobile devices and the CRM platform. The CRM platform is used to store and process foundry data for use in the system. The CRM platform communicates with the ERP computing platform to obtain actual sales information for each of the sales targets for use in the system. It is understood that the CRM and SAP platforms can be run on a computer network or server system.

While certain embodiments of the present invention are described in detail above, the scope of the invention is not to be considered limited by such disclosure, and modifications are possible without departing from the spirit of the invention as evidenced by the following claims:

What is claimed is:

1. A method for tracking and facilitating the identification of sales targets, the method comprising the steps of:
  displaying, in a graphical user interface on an electronic display, an image of a map of a geographic region encompassing a sales region;
  retrieving, from one or more electronic storage devices, target data regarding a plurality of sales targets, wherein said target data comprises a geographic location, sales potential, company identity information, and assigned sales representative information associated with each of the plurality of sales targets;
  dynamically displaying, on said map, a first plurality of selectable icons, wherein each of the first plurality of selectable icons are depicted on the map at a position substantially corresponding with the geographic location for the sales target, and with a first indicator representing sales potential for the sales target as falling within a first predetermined monetary range;

dynamically displaying, on said map, a second plurality of selectable icons, wherein each of the second plurality of selectable icons are depicted on the map at a position substantially corresponding with the geographic location for the sales target, with a second indicator representing sales potential for the respective sales target as falling within a second predetermined monetary range, the second predetermined monetary range being lower than the first predetermined monetary range;

in response to a selection of a particular one of the plurality of selectable icons, displaying, in a first region in a first window on the graphical user interface, a visualization depicting the sales potential of the selected sales target as a portion of the sales of a representative company, company identity information for said selected sales target, and assigned sales representative information for said selected sales target;

displaying a selectable reporting icon;

in response to a selection of the selectable reporting icon, displaying an additional window on the graphical user interface;

displaying in the additional window a plurality of prompts for entering information about the sales target associated with the selected icon;

storing the entered information as target data associated with the selected icon;

dynamically displaying the entered information in the visualization.

2. The method of claim 1, wherein dynamically displaying means to display the information automatically as the underlying target data changes and wherein there is a time lag between the time the target data is changed to the time the displayed information is updated.

3. The method of claim 1, further comprising the steps of:

dynamically displaying, on said map, a third plurality of selectable icons each as a first shape, wherein each of the third plurality of selectable icons are depicted on the map at a position substantially corresponding with the geographic location for the sales target, and wherein each of the third plurality of selectable icons are associated with distributors; and dynamically displaying, on said map, a fourth plurality of selectable icons each as a second shape, wherein each of the fourth plurality of selectable icons are depicted on the map at a position substantially corresponding with the geographic location for the sales target, and wherein each of the fourth plurality of selectable icons are associated with direct sales targets and not distributors.

4. The method of claim 1, further comprising the step of:

displaying, in a second region in the first window on the graphical user interface, a bar graph having a first bar portion dynamically representing actual or estimated sales of a particular product line of the sales target associated with the selected particular icon and a second bar portion dynamically representing potential sales of the particular product line of the sales target associated with the selected particular icon.

5. The method of claim 4, wherein the bar graph is in a circular shape and wherein the bar portion is concentric with the second bar portion.

6. The method of claim 1, further comprising the step of:

displaying a selectable filter icon;

in response to a selection of the selectable filter icon, displaying, on the graphical user interface, a second window;

displaying, in the second window, a plurality of selectable filter factors, the filter factors comprising sales representatives, sales potential, and sales territory.

7. The method of claim 6, further comprising the step of:

in response to selecting one of the plurality of selectable filter factors, displaying on the map only those selectable icons associated with target data corresponding to the selected filter factor.

8. The method of claim 7, wherein the selectable filter factors further comprise industry served, metal type, product line, and molding process.

9. The method of claim 7, further comprising the step of:

in response to selecting the sales potential filter factor, displaying a first selectable range of sales potential and a second selectable range of sales potential.

10. The method of claim 9, further comprising the step of:

in response to selecting the first selectable range of sales potential, displaying on the map only those selectable icons associated with target data indicating a sales potential that falls within the first range of sales potential.

11. The method of claim 7, further comprising the step of:

in response to selecting the sales territory filter factor, displaying a first selectable sales territory and a second selectable sales territory.

12. The method of claim 7, further comprising the step of:

in response to selecting the sales representative filter factor, displaying a selectable name of a first sales associate and selectable name of a second sales associate;

in response to selecting the selectable name of a first sales associate, displaying on the map only those selectable icons associated with target data indicating an assigned sales representative matching the first sales associate.

13. The method of claim 7, further comprising the step of:

in response to selecting the sales representative filter factor, displaying a selectable name of a first sales associate and selectable name of a second sales associate;

in response to selecting the selectable name of a first sales associate and the selectable name of the second sales associate, displaying on the map only those selectable icons associated with target data indicating an assigned sales representative matching the first sales associate or the second sales associate;

providing a color toggle feature that displays the selectable icons representing the location of potential sales targets that are assigned to the first sales associate in a first color and displays the selectable icons representing the location of potential sales targets that are assigned to the second sales associate in a second color.

14. The method of claim 1, further comprising the step of:

dynamically displaying in the map a bar graph having a bar portion representing actual or estimated sales of the sales target associated with the selected icon and a second bar portion representing the sales potential of the sales target associated with the selected icon.

15. The method of claim 1 wherein the first indicator comprises a first color and the second indicator comprises a second color.

16. The method of claim 1 further comprising the steps of:

receiving, from a user device, a user location; and dynamically displaying the geographic region to correspond with the received user location.

* * * * *